Feb. 9, 1954    W. R. WINSLOW    2,668,603
VIBRATION DAMPING DEVICE
Filed Oct. 15, 1949
FIG. 1.
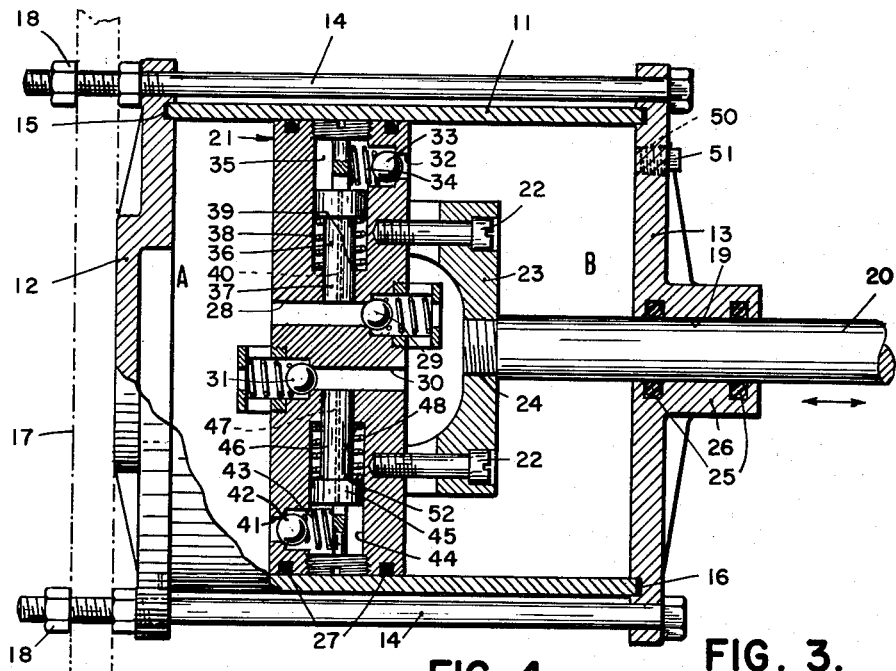
FIG. 2.
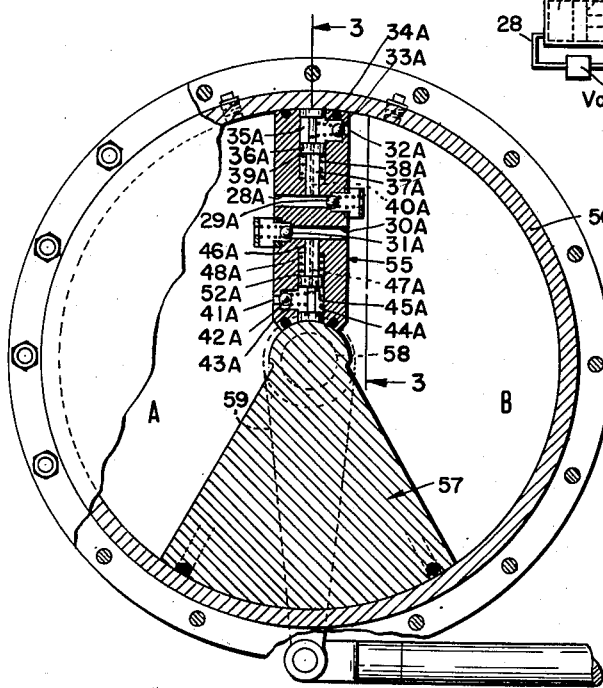
FIG. 4.
FIG. 3.
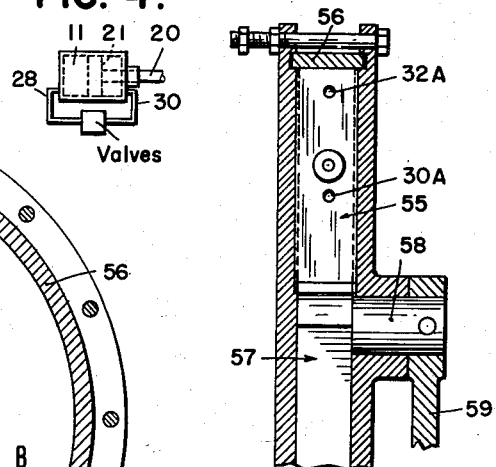
INVENTOR
WILLIAM R. WINSLOW
BY
ATTORNEY Patented Feb. 9, 1954

2,668,603

UNITED STATES PATENT OFFICE 2,668,603

VIBRATION DAMPING DEVICE

William R. Winslow, Culver City, Calif.

Application October 15, 1949, Serial No. 121,470

6 Claims. (Cl. 188—96)

1

This invention relates to a device for reducing and eliminating undesirable vibration in movable members, such as aircraft landing wheels, aircraft control surfaces, steering wheels, and the like.

Illustrative of the application of my invention and the problem which it solves, damping devices are usually provided on swiveling wheels of aircraft landing gears to prevent them from shimmying. For this use, it is desirable that the damping device effect damping of two distinct kinds of movements of the landing wheels, namely, first a high degree of damping to eliminate high frequency shimmying and second, a low degree of damping to permit quick aligning rotation about the axle of swivel at the moment of ground contact. Damping devices which are now available for this purpose provide damping forces which are proportional to the angular velocity or acceleration about the axis of swivel. For this reason, the rapid and highly accelerated aligning motion which occurs in the castered wheel at the moment of ground contact receives a degree of damping which is unnecessarily high. The result is a delay in the alignment of an initially misaligned wheel which causes the aircraft to lurch in the direction of the misalignment. Misalignment in the castered landing wheels may occur because of the angular relation of the wheel to the center line of the aircraft at the moment of ground contact, or it may occur due to crosswind landings in which the aircraft drifts sidewise relative to the ground.

As another illustration of the problem solved by my invention, aircraft control surfaces such as rudders and ailerons have a tendency, particularly at high flight speeds, to flutter unless large masses or weights are added to make these airplane parts dynamically stable. Freedom of pilot-manipulated motions in such aircraft control surfaces is essential for the control of the airplane and it is desirable that any device for reducing the flutter about the hinge axis of the control surfaces should not interfere with the pilot-manipulated motions. Added weight is also to be avoided in aircraft and my vibration damping device being of relatively light weight controls the tendency to high frequency fluttering without much added weight and without interfering with the desired pilot-manipulated motions.

It is therefore an object of my invention to provide means for reducing and eliminating undesirable vibrations and high frequency oscillations while allowing other motions irrespective of their velocity, acceleration, or distance of travel to remain relatively undamped.

2

These and other objects are attained by my invention which will be understood from the following description, reference being made to the accompanying drawing in which:

Figure 1 is a side elevation, partly in section, showing one form of my invention;

Figure 2 is a plan view partly in section showing an alternative form of my invention;

Figure 3 is a cross-sectional view taken on the line 3—3 of Figure 2; and

Figure 4 is an elevational view of another form of the device shown in Figure 1, in which the valve structure is outside the cylinder.

A preferred form of my invention is shown in Figure 1, in which an elongated cylindrical body 11 is disposed between a closed end plate 12 and a cylinder head 13 by means of tie bolts 14 extending from the outer peripheries of the end plate 12 and the cylinder head 13. The cylindrical body 11 is preferably seated in ring grooves 15 and 16, respectively, in the closed end plate 12 and the cylinder head 13. The tie bolts may conveniently be extended beyond the closed end plate 12 to provide mounting means for attaching the device to a structural member 17, the nuts 18 serving to hold the device to the structural member. The cylinder head 13 is provided with an opening 19 for the piston rod 20, which is attached to the piston head 21 by the bolts 22 through the cage 23 and into the face of the piston head 21, the cage being threadedly attached at 24 to the piston rod 20. Gaskets 25 preferably of O ring type are provided in the hub 26 of the cylinder head 13 to prevent leakage around the piston rod 20.

The piston head is adapted to slide inside the cylindrical body 11 and is preferably provided with O ring gaskets 27 in its outer periphery to prevent leakage of the hydraulic fluid which is contained in the cylinder. Two check valved passages are provided through the piston for the transfer of liquid from one side of the piston to the other, one of these passages indicated as 28 permitting liquid to flow from the chamber A to the chamber B through the spring pressed ball check 29, and the other passage indicated as 30 permitting the flow of hydraulic liquid from the chamber B to the chamber A through the spring pressed ball check valve 31. Hydraulic liquid may also pass from the chamber B to the chamber A through an auxiliary passageway having an inlet 32 which is on the face of the piston head adjacent the chamber B, this inlet 32 being normally closed by the ball 33 held in place by the spring 34. The inlet 32 is connected to a cylindrical chamber 35 which is disposed within the piston head at right angles to the passage 28. A metering piston 36 is provided within cylindrical chamber 35, the reduced end 37 of the metering piston being adapted to extend into the passage 28 to constrict the opening thereof. A coiled spring 38 is provided around the metering piston and abutting the shoulder 39 in the cylindrical chamber 35, this spring tending to normally keep the metering piston end 37 out of the passage 28.

A small axial drainage opening 40 in the piston 36 is provided to permit the passage of liquid from the chamber 35 to the passage 28.

A similar auxiliary or secondary passage through the piston head for the movement of liquid from chamber A to chamber B is provided in association with the passage 30, there being provided an inlet 41 on the face of the piston head 21 adjacent the chamber A through which the liquid passes against the ball 42 and its holding spring 43 into the cylindrical chamber 44 in which is disposed the metering piston 45, the reduced end 46 of which is adapted to at times extend into the passage 30 to constrict its opening, being normally held in the chamber 44 by the spring 48 against the shoulder 52. The metering piston 45 is provided with a small axial drainage opening 47 which is adapted to permit the passage of liquid from the inlet 41 to the passage 30.

The piston rod 20 outside the cylinder is connected either directly or indirectly to the element which is subjected to vibration so that longitudinal movement of the piston rod coincides with the movement of the vibrating or movable part of the airplane or other machine for which damping is desired. The cylinder 11 may be supplied with hydraulic fluid through the filling hole 50 which is closed by the plug 51.

Assuming that the piston head moves in the direction from B toward A, a greater pressure exists in the liquid in the chamber A than in the chamber B and therefore the liquid tends to pass through the piston to equalize the pressures. The principal flow of liquid is through the passage 28 and the check valve 29. No liquid flows through the passage 30 since this is prevented by the check valve 31. Some liquid passes through the inlet 41 past the ball 42 which is lightly held by the spring 43 into the cylindrical chamber 44. This additional liquid in the chamber 44 exerts a pressure on the metering piston 45 and moves it more or less into the passage 30 against the pressure of the spring 48. Some of the liquid in the cylindrical opening 44 escapes through the small axial drainage opening 47 into the passage 30. So long as there is a movement of liquid from chamber A to chamber B and enough differential pressure across the metering piston 45 to overcome the force of the spring 48, the metering piston 45 remains in the displaced position extending into the passage 30. When this differential pressure is insufficient to overcome the spring force, the metering piston 45 moves back into the cylindrical chamber 44 leaving the passage 30 unrestricted. This will occur when liquid is passing from the chamber A to the chamber B at a relatively slow rate or when there is no passage of liquid. Under this condition, a reversal of flow, that is from B and A, causes liquid to flow through the orifice 30 and check valve 31 and results in similar functioning of the liquid in the passage 32 through the check valve 33 into the cylindrical chamber 35 acting against the metering piston 36 with its spring 38 and its drainage opening 40 to function identically as described in the corresponding parts 28, 29, 41, 42, 44, 45, 46, 47, and 48.

However, if liquid in passing from chamber B to chamber A at a relatively rapid rate becomes reversed in its direction of flow due to a sudden change in the direction of the movement of the piston rod 20 and the piston head 21, a correspondingly small amount of liquid, depending upon the time interval, will have escaped from the opening 44 through the drainage passage 47 and hence the metering piston 45 will have moved a correspondingly short distance back into a position of less restriction of the passage 30 and will therefore continue to be in a position to partly constrict the reverse flow of liquid through the opening 30. As the flow continues from chamber B to chamber A, the metering piston 45 moves out of the passage 30 as to allow less restricted flow through the orifice and check valve.

Since the damping effect is proportional to the restriction in the flow between the chambers A and B, damping occurs for a short period of time immediately after each sudden reversal in either direction. During this short period of time, the damping effect of the constriction varies inversely with the time and directly with some power approximately the square of the velocity of liquid flow.

While I have shown and particularly described the valve mechanism for controlling the flow of hydraulic liquid through the piston head, the valve mechanism may be as well installed outside the piston and cylinder in outside passageways hydraulically connecting the two working chambers.

An alternative form of my invention is shown in Figures 2 and 3 in which a valving arrangement similar to that above-described is provided in either the fixed or movable partition. As shown, the cylinder 56 is provided with a fixed partition or dam 55 and a rotary piston 57 attached to the shaft 58, to which the lever arm 59 is attached. The lever arm 59 is connected to the vibrating or oscillating mechanism or member and the movement of the rotary piston 57 corresponds in its effect to the movement of the cylindrical piston head 21 of the form shown in Figure 1. The valve arrangement in the dam 55 consists of two passages 28A and 30A each having a spring-pressed ball check valve indicated respectively as 29A and 31A. Passage 28A permits liquid to flow from the chamber A to the chamber B through the spring-pressed ball check 29A. The other passage 30A permits the flow of hydraulic liquid from the chamber B to the chamber A through the spring-pressed ball check valve 31A. Hydraulic liquid may also pass from the chamber B to the chamber A through an auxiliary passageway having an inlet 32A which is on the face of the dam 55 adjacent the chamber B, this inlet 32A being normally closed by the ball 33A held in place by the spring 34A. The inlet 32A is connected to a cylindrical chamber 35A which is disposed within the dam 55 substantially at right angles to the passage 28A. A metering piston 36A is provided within the cylindrical chamber 35A, the reduced end 37A of the metering piston being adapted to extend into the passage 28A to constrict the opening thereof. A coiled spring 38A is provided around the metering piston and abutting the shoulder 39A in the cylindrical chamber 35A, this spring tending to normally keep the metering piston end 37A out of the passage 28A. A small axial drainage opening 40A in the metering piston 36A is provided to permit the passage of liquid from the chamber 35A to the passage 28A.

A similar auxiliary or secondary passage through the dam 55 for the movement of liquid from chamber A to chamber B is provided in association with the passage 30A, there being provided an inlet 41A on the face of the dam 55 adjacent the chamber A through which the liquid passes against the ball 42A and its holding spring 43A into the cylindrical chamber 44A, in which is disposed a metering piston 45A, the reduced end 46A of which is adapted to at times extend into the passage 30A to constrict its opening, being normally held in the chamber 44A by the spring 48A against the shoulder 52A, the metering piston 45A is provided with a small axial drainage opening 47A which is adapted to permit the passage of a liquid from the inlet 41A to the passage 30A.

The functioning of the valve mechanism as above described for the preferred form of the device shown in Figure 1 applies also to the alternative form of the rotary piston shown in Figures 2 and 3.

The advantages of my invention will be apparent from the above description of the damping effect produced upon the quick reversal of the liquid flow in either direction. My damping device when attached to parts of airplanes and the like which are required to be moved for control purposes by the pilot or operator does not impose additional resistance to movements made for normal operating control, even successive movements in opposite direction when such movements are made in the normal manner. My device is effective in damping reversals of movement of frequencies above those of desired operator-control movements, and of the order of frequency of vibrations, shimmying, and oscillations encountered in airfoil surfaces, castered landing wheels, vehicle steering wheels and the like during operation thereof. The actual frequency which it may be desirable to damp out may be selected, and the damping device openings and spring pressures may be selected to effect the damping of frequencies which are undesired.

My device is relatively simple to manufacture and use, and requires no manitenance except that which is normally associated with hydraulic damping mechanisms. My device damps quick reversal movements such as vibrations without seriously increasing the resistance to normal movements in either direction.

I claim:

1. A vibration damping device comprising a closed hydraulic cylinder having a piston adapted to move therein defining left and right hydraulic working chambers; a left-to-right one-way conduit and right-to-left one-way conduit; variable constricting means for each of said one-way conduits; actuating means for each of said constricting means including an hydraulic plunger and a cylindrical cavity in which said plunger moves, a check-valved inlet arranged to admit hydraulic liquid from the working chamber having the higher hydraulic pressure to the plunger cavity of said means which serves to constrict the flow in the conduit which carries liquid from the opposite chamber, a spring means for moving said plunger against the hydraulic pressure in said cavity when substantially no flow is being admitted through said check-valved inlet, and a means for bleeding the hydraulic liquid from said plunger cavity to the working chamber of lower pressure.

2. A vibration damping device comprising a closed hydraulic cylinder having a piston adapted to move therein defining left and right hydraulic working chambers; a left-to-right one-way conduit and a right-to-left one-way conduit; plug means extending into each of said one-way conduits and adapted to more or less constrict the flow of hydraulic liquid therethrough; an hydraulic plunger for actuating each of said plug means including a cylindrical cavity in which said plunger moves; a check-valved inlet to each cylindrical cavity, one arranged to admit hydraulic liquid from said right working chamber to the cavity and corresponding plug means in said left-to-right one-way conduit and the other arranged to admit hydraulic liquid from said left working chamber to the cavity and corresponding plug means in said right-to-left one-way conduit; spring means at each plug for moving said plunger against the hydraulic pressure in said cavity when substantially no flow is being admitted through said corresponding check-valved inlet; and means for bleeding the hydraulic liquid from said plunger cavity to the working chamber of lower pressure.

3. A vibration damping device comprising a closed hydraulic cylinder having a fixed radial partition and a rotary piston adapted to move therein defining left and right hydraulic working chambers, said movable piston being attached to a shaft; left-to-right and right-to-left one-way conduits in said fixed partition adapted to carry liquid between said chambers; plug means extending into each of said one-way conduits and adapted to more or less constrict the flow of hydraulic liquid therethrough; an hydraulic plunger for actuating each of said plug means including a cylindrical cavity in said fixed partition in which said plunger moves; a check-valved inlet to each cylindrical cavity, one arranged to admit hydraulic liquid from said right working chamber to the cavity and corresponding plug means in said left-to-right one-way conduit and the other arranged to admit hydraulic liquid from said left working chamber to the cavity and corresponding plug means in said right-to-left one-way conduit; spring means at each plug for moving said plunger against the hydraulic pressure in said cavity when substantially no flow is being admitted through said corresponding check-valved inlet; and means for bleeding the hydraulic liquid from said plunger cavity to the working chamber of lower pressure.

4. A vibration damping device comprising hydraulic cylinder and piston elements arranged to provide left and right working chambers, left-to-right and right-to-left, one-way pressure relief conduits arranged to pass liquid from one working chamber to the other on piston movements in opposite directions, a variable flow reducing valve in each of said one-way conduits, pressure actuated devices for operating said flow reducing valves in the flow reducing direction, means for returning said flow reducing valves in the opposite direction, a one-way pressure transmitting passage extending from the left working chamber to the pressure actuated device controlling the right-to-left conduit, a one-way pressure transmitting passage from the right working chamber to the pressure actuated device controlling the left-to-right conduit, a bleed passage for releasing liquid trapped in the passage from the left working chamber back into the right-to-left pressure relief conduit and a bleed passage for releasing liquid trapped in the passage from the right working chamber back to the one-way, left-to-right pressure relief conduit.

5. A vibration damping device comprising a hydraulic cylinder and piston combination with left and right working chambers, left-to-right and right-to-left one-way conduits adapted to carry liquid from one working chamber to the other as said piston moves in the opposite direction respectively, variable constricting means for each of said one-way conduits, storage chambers in which each of said variable constricting means moves, a check-valved passage allowing liquid to pass only from said right chamber to the storage chamber and constricting means for said left-to-right conduit, a check-valved passage allowing liquid to pass only from said left chamber to the storage chamber and constricting means for said right-to-left conduit, said constricting means in said left-to-right conduit moving from an initial configuration having a certain constricted area of passage to a configuration having a varied constricted area when there is a substantial flow of liquid through said right-to-left conduit, and said constricting means in said right-to-left conduit moving from an initial configuration having a certain constricted area of passage to a configuration having a varied constricted area when there is a substantial flow of liquid through said left-to-right conduit, and means to return each of said variable constricting means to said initial configuration when the flow in the corresponding check-valved passage is slight or non-existent.

6. A reverse motion damping device comprising a hydraulic cylinder and piston combination providing left and right working chambers, left-to-right and right-to-left one-way conduits to pass liquid from one working chamber to the other on piston movement in opposite directions, variable constricting means for controlling flow through each of said one-way conduits, pressure actuated devices for operating said constricting means, a one-way pressure transmitting passage extending from the left working chamber to the pressure actuated device controlling the right-to-left conduit, a one-way pressure transmitting passage from the right working chamber to the pressure actuated device controlling the left-to-right conduit, means for restoring said pressure actuated devices to a normal conduit open position upon release of pressure on said devices and bleed passages for releasing liquid trapped in the one-way passages to said devices.

WILLIAM R. WINSLOW.

References Cited in the file of this patent

UNITED STATES PATENTS

| Number | Name | Date |
|---|---|---|
| 2,095,112 | Wallace | Oct. 5, 1937 |
| 2,161,811 | Grebe | June 13, 1939 |
| 2,309,499 | Chenault | Jan. 26, 1943 |
| 2,315,531 | Lucht | Apr. 6, 1943 |